US009827875B2

(12) United States Patent
Wang

(10) Patent No.: US 9,827,875 B2
(45) Date of Patent: Nov. 28, 2017

(54) DRIVER VISIBILITY ENHANCING SEAT ADJUSTMENT

(71) Applicant: Faraday&Future Inc., Gardena, CA (US)

(72) Inventor: Jennifer Hwa-Yun Wang, San Gabriel, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 14/839,735

(22) Filed: Aug. 28, 2015

(65) Prior Publication Data

US 2017/0057379 A1 Mar. 2, 2017

(51) Int. Cl.
| | |
|---|---|
| B60R 22/00 | (2006.01) |
| E05F 15/00 | (2015.01) |
| G05D 1/00 | (2006.01) |
| B60N 2/02 | (2006.01) |
| B60N 2/00 | (2006.01) |
| B60N 2/06 | (2006.01) |
| B60N 2/12 | (2006.01) |
| B60N 2/48 | (2006.01) |

(52) U.S. Cl.
CPC .......... B60N 2/0244 (2013.01); B60N 2/002 (2013.01); B60N 2/06 (2013.01); B60N 2/12 (2013.01); B60N 2/4805 (2013.01); *B60N 2002/0268* (2013.01)

(58) Field of Classification Search
CPC ........ B60N 2/002; B60N 2/0244; B60N 2/01; B60N 2/02; B60N 2/4805; B60N 2002/0268

USPC .......................................................... 701/49
See application file for complete search history.

(56) References Cited

U.S. PATENT DOCUMENTS

| | | | | |
|---|---|---|---|---|
| 8,527,146 B1 * | 9/2013 | Jackson | ............ | B60W 50/0098 180/273 |
| 2009/0066065 A1 * | 3/2009 | Breed | ............ | B60J 10/00 280/735 |
| 2010/0152977 A1 * | 6/2010 | Jungert | ............ | B60N 2/002 701/49 |
| 2015/0239367 A1 * | 8/2015 | Sickon | ............ | B60N 2/002 340/457.1 |

OTHER PUBLICATIONS

Front passenger's seat adjustment via MMI (Coupé), http://s208276702.websitehome.co.uk/onboard/o_m00203.htm, accessed Aug. 26, 2015.

* cited by examiner

*Primary Examiner* — Isaac Smith
(74) *Attorney, Agent, or Firm* — Finnegan, Henderson, Farabow, Garrett & Dunner LLP

(57) ABSTRACT

A control system is disclosed for enhancing the visibility of a driver of a vehicle. The control system may include a sensor configured to generate a signal indicative of a weight placed on a passenger seat and at least one motor configured to adjust a position of the passenger seat. The control system may also include a controller in communication with the sensor and the at least one motor. The controller may be configured to receive the signal from the sensor, determine that the passenger seat is unoccupied based on the signal, and automatically generate a command signal directed to the at least one motor to adjust the passenger seat to a prospective position.

19 Claims, 4 Drawing Sheets

DRIVER VISIBILITY ENHANCING SEAT ADJUSTMENT

TECHNICAL FIELD

The present disclosure relates generally to a control system for a vehicle, and more particularly, to a seat adjustment control system for enhancing driver visibility.

BACKGROUND

Objects that obstruct the visibility of a driver are one of the leading causes of automobile accidents. Specifically, safe driving requires unobstructed sightlines through the windshield, as well as side and rear windows. This is especially important for maintaining safe distances from other vehicles during lane changing and parallel parking. However, vehicles of modern designs, such as sports cars, usually have tight confines of the cabin and relatively small windows. Consequently, maintaining proper visibility is difficult in a vehicle because objects within the cabin can readily block a driver's sightline.

Common obstructions include backs and headrests of passenger seats. Passenger seats are typically adjustable in a number of directions, including fore/aft, up/down, and inclined/reclined, and often have headrests that can be raised/lowered. The adjustability provides comfort to the occupants but also may cause at least one of the back and the headrest to create a blind spot. Recently, this has become especially problematic due to modern styles favoring smaller window and sharper angles. Furthermore, the adjustability of the passenger seat can also create a distraction for the driver because the manual controls of the passenger seats are often inaccessible from the driver seat.

The disclosed control system is directed to overcoming one or more of the problems set forth above and/or other problems in the prior art, and to providing an improved seat adjustment control system that enhances driver visibility.

SUMMARY

One aspect of the present disclosure is directed to a control system for enhancing the visibility of a driver of a vehicle. The control system may include a sensor configured to generate a signal indicative of a weight placed on a passenger seat and at least one motor configured to adjust a position of the passenger seat. The control system may also include a controller in communication with the sensor and the at least one motor. The controller may be configured to receive the signal from the sensor, determine that the passenger seat is unoccupied based on the signal, and automatically generate a command signal directed to the at least one motor to adjust the passenger seat to a prospective position.

Another aspect of the present disclosure is directed to a method of enhancing the visibility of a driver of a vehicle. The method may include sensing a weight placed on a passenger seat and responsively generating a signal. The method may also include receiving the signal and determining that the passenger seat is unoccupied based on the signal. The method may further include generating a command signal directed to at least one motor and adjusting the passenger seat to a prospective position.

Yet another aspect of the present disclosure is directed to a vehicle. The vehicle may include a driver seat configured to accommodate a driver and a passenger seat configured to accommodate a passenger. The vehicle may also include a control system having a sensor configured to generate a signal indicative of a weight placed on the passenger seat and at least one motor configured to adjust a position of the passenger seat. The control system may also include a controller in communication with the sensor and the at least one motor. The controller may be configured to receive the signal from the sensor, determine the passenger seat is unoccupied based on the signal, and automatically generate a command signal directed to the at least one motor to adjust the passenger seat to a prospective position.

Still another aspect of the present disclosure is directed to a non-transitory computer-readable medium storing instructions which, when executed, cause one or more processors to perform a method enhancing the visibility of a driver of a vehicle. The method may include sensing a weight placed on a passenger seat and responsively generating a signal. The method may also include receiving the signal and determining that the passenger seat is unoccupied based on the signal. The method may further include generating a command signal directed to at least one motor and adjusting the passenger seat to a prospective position.

DETAILED DESCRIPTION

Figure 1:
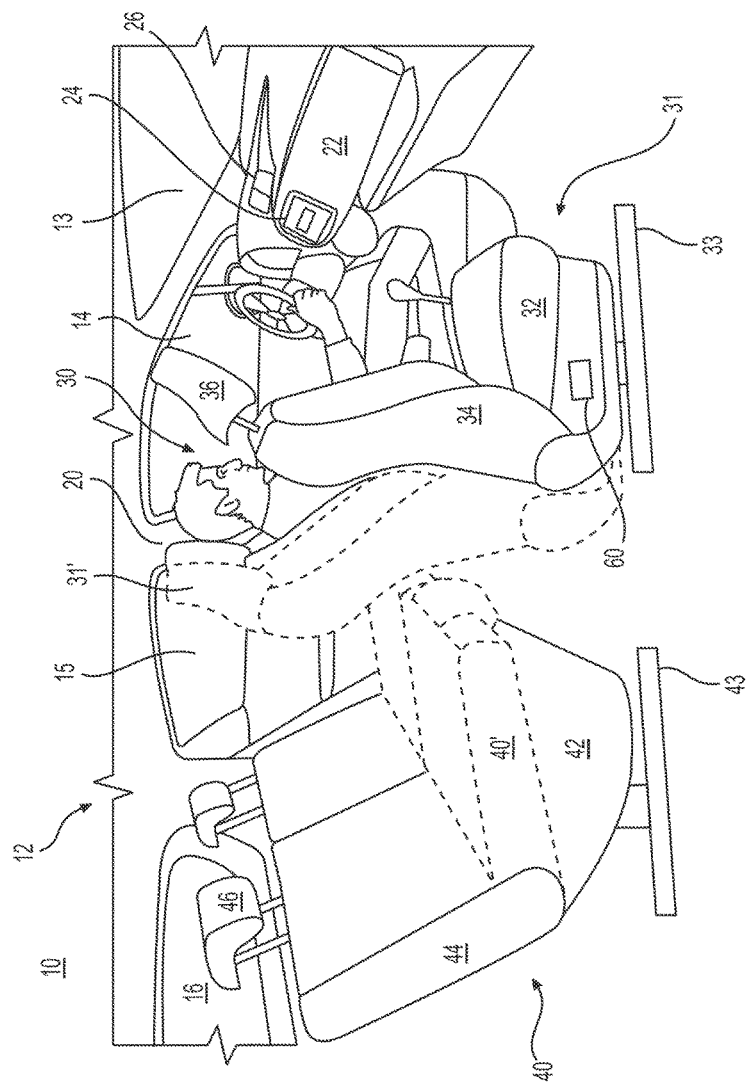
FIG. 1 is a diagrammatic illustration of an exemplary vehicle interior, according to an aspect of the disclosure.

FIG. 1 provides a diagrammatic illustration of an exemplary vehicle interior according to an aspect of the disclosure. As illustrated in FIG. 1, a vehicle 10 may include, among other things, a frame 12 having one or more pillars 20, a dashboard 22, and a number of windows, for example, a windshield 13, a front side window 14, a back side window 15, and a rear window 16. Dashboard 22 may have various components and devices installed thereon, including, for example, a user interface 24 and a camera 26. It is contemplated that vehicle 10 can be an electric vehicle, a fuel cell vehicle, a hybrid vehicle or a conventional internal combustion engine vehicle. Vehicle 10 may have any body style, such as a sports car, a coupe, a sedan, a truck, a station wagon, an SUV, a minivan, or a conversion van.

Vehicle 10 may also include a number of seats to accommodate a number of occupants, such as a driver seat 30, a front passenger seat 31, and at least one rear passenger seat 40. Seats 30, 31, 40 may be arranged in any number of rows. For example, rear passenger seat 40 may be in the second row of a sedan, or in the second and/or third row of a minivan. Each seat may be secured to frame 12 via a rail and may include a number of components, including a seat base, a seat back, a headrest, motors, and wiring harnesses. For example, front passenger seat 31 may be secured to frame 12 via a rail 33 and include a seat base 32, a seat back 34, and a headrest 36. Rear passenger seat 40 may be connected to frame 12 via a rail 43, and may include a seat base 42, a seat back 44, and a headrest 46. Each component of seat 30, 31, 40 may be adjusted, by manipulation of a manual control 60, to comfortably accommodate the occupants. For example, seat base 32, 42 may be configured to rise and lower relative to frame 12, to slide fore and aft along rail 33, 43, and to be secured in a number of different positions between a forward most position (e.g., closest to the front of vehicle 10), and a back most position (e.g., closest to the back of vehicle 10). Seat back 34, 44 may be configured to pivot with respect to seat base 32, 42 and may be secured at a number of tilt angles. Headrest 36, 46 may be configured to extend and retract relative to seat back 34, 44 and may be secured in a number of different positions.

As further depicted in FIG. 1, passenger seat 31, 40 may be in positions that obstruct the driver's sightline. Therefore, it is contemplated that passenger seat 31, 40 may be provided one or more prospective positions that do not substantially obstruct a sightline of the driver. To achieve the prospective positions, at least one of seat base 32, 42, seat back 34, 44, and headrest 36, 46 may be automatically adjusted. For example, as depicted in FIG. 1, front passenger seat 31 may have a prospective position 31' substantially aligned with pillar 20 of the frame 12. To achieve prospective position 31', seat base 32 may be moved fore or aft along rail 33 to substantially align the back of seat base 32 with the base of pillar 20. Seat back 34 may also be tilted to approximate the angle of pillar 20, and headrest 36 may be retracted to a fully retracted position. FIG. 1 also depicts a prospective position 40' for rear passenger seat 40, where the tilt angle of seat back 44 is adjusted to position seat back 44 over seat base 42, where seat back 44 may or may not directly contact seat base 42. Prospective position 40' may, additionally or alternatively, be achieved by lowering headrest 46 relative to seat back 44, such that it does not obstruct rear window 16. Prospective position 40' may also include adjusting the seat base 42 fore or aft along rail 43, and raising or lowering seat base 42 relative to frame 12. Other prospective positions for each of passenger seat 31, 40 are contemplated. For example, front passenger seat 31 may be provided a prospective position (not shown) where front passenger seat 31 is adjusted to a rear-most position along rail 33. Alternatively or additionally, seat back 34 may be tilted to have a maximum tilt angle relative to seat base 32. It is also contemplated (as later discussed in more detail) that the prospective positions of passenger seats 31, 40 may be determined based on the position of driver seat 30, and may be periodically or continuously adjusted based on adjustment of driver seat 30. Pillar 20 may be any structural or non-structural pillar of vehicle 10, such as an A-pillar, a B-pillar, a C-pillar, etc. The A-pillar may be a forward-most pillar of frame 12, extending between windshield 13 and front side window 14. The B-pillar may be positioned substantially in a mid-section of frame 12, extending between front side window 14 and back side window 15. The C-pillar may be a rear-most pillar of frame 12, extending between back side window 15 and rear window 16. Alternatively, a non-structural pillar may be formed by one or more door frames when the vehicle door is closed. For example, a structural B-pillar may be omitted from frame 12 of vehicle 10. When a front door or a rear door is closed, the door frame of the front door or the rear door may form a non-structural pillar near a mid-section of frame 12.

Figure 2:
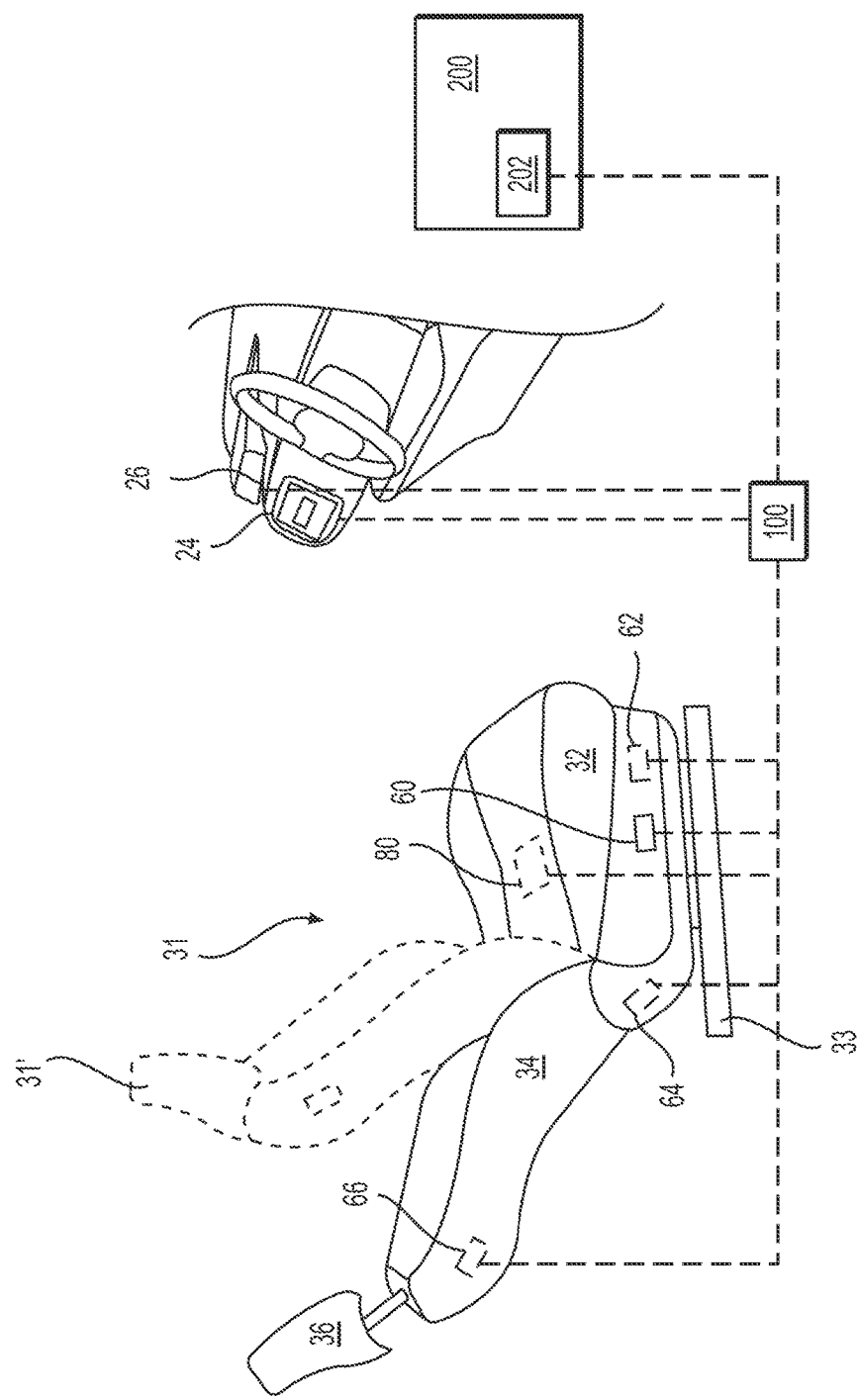
FIG. 2 is a diagrammatic illustration of an exemplary control system that may be used with the vehicle interior of FIG. 1, according to an aspect of the disclosure.

FIG. 2 provides a diagrammatic illustration of an exemplary control system 11 that may be used to automatically adjust passenger seat 31, 40 of vehicle 10. For example, control system 11 may be configured to automatically adjust at least one passenger seat 31, 40 to a prospective position after it is determined that passenger seat 31, 40 is unoccupied. Even though only front passenger seat 31 is depicted in FIG. 2, components of control system 11 may, additionally or alternatively, be applied to back passenger seats 40, or any other passenger seats of vehicle 10.

As illustrated in FIG. 2, control system 11 may include, among other things, a controller 100, user interface 24, camera 26, manual control 60, a plurality of motors that drive the various components of front passenger seat 31, including, for example, a base motor 62, a back motor 64, a headrest motor 66, and a plurality of sensors including, for example, a status sensor 202 and a weight sensor 80. Controller 100 may be connected to the various components of control system 11 for two-way communication via communication cables, wireless networks, or other communication mediums.

Each seat 30, 31, 40 may include motors 62, 64, 66 configured to adjust the position of seats 30, 31, 40, when actuated. For example, base motor 62 may be configured to raise and lower seat base 32 relative to rail 33 and to slide seat base 32 fore and aft along rail 33. A back motor 64 may be configured to pivot seat back 34 to adjust the tilt angle relative to seat base 32. A headrest motor 66 may be configured to raise and lower headrest 36 relative to seat back 34. Even though depicted as three separate motors 62, 64, and 66, a single motor or some type of combination motor (not shown) may be individually configured to adjust the components 32, 33, 34 of front passenger seat 31, replacing motors 62, 64, 66. Motors 62, 64, 66 may be hydraulically or rotary driven and may be controlled by command signals by at least one of manual control 60, user interface 24, and controller 100.

Each seat 30, 31, 40 may include manual control 60 connected, through wire or wirelessly, to motors 62, 64, 66 in order to allow the occupant to manually adjust seat 30, 31, 40. As depicted in FIG. 2, manual control 60 may be positioned on a side of base seat 32 in a location convenient for the occupant of seat 30, 31, 40. Manual control 60 may have a plurality of actuators (e.g., buttons) to allow individual adjustment of seat base 32, seat back 34, and headrest 36. In one embodiment, manual control 60 may be configured to receive a user input and generate a command signal that may override controller 100 and may automatically disable the automatic seat adjustment. In another embodiment, manual control 60 may be disabled when the automatic operation of controller 100 is enabled, requiring the occupant to disable the automatic operation of controller 100 prior to receiving any user input to adjust passenger seat 31, 40 via user manual control 60.

Vehicle 10 may have a user interface 24 embedded or mounted onto its dashboard 22, as depicted in FIG. 2. User interface 24 may be, additionally or alternatively, installed in a center console, a steering wheel, and/or a smart phone (not shown). User interface 24 may be configured to receive data input from occupants, and send data to controller 100. User interface 24 may include an LCD, an LED, a plasma display, or any other type of display. User interface 24 may provide a Graphical User interface (GUI) presented on the display for user input and data display. User interface 24 may further include a touchscreen, a touch pad, a keyboard, a mouse, or a tracker ball to enable user input. User interface 24 may also be configured to receive inputs via voice commands and/or gesture commands.

User interface 24 may allow occupants to toggle through a variety of controls associated with vehicle 10. For example, user interface 24 may provide occupants convenient control of the position of seats 30, 31, 40 of vehicle 10. In this sense, an occupant in the driver seat 30 may be allowed control of the position of the front passenger seat 31 and rear passenger seats 40 without accessing manual controls 60 positioned on passenger seats 31, 40. User interface 24 may be configured to control motors 62, 64, 66 by generating and sending a command signal directly to motors 62, 64, 66 and/or sending a signal to controller 100, which in turn sends a command signal to motors 62, 64, 66. User interface 24 may also allow the occupant to enable or disable any automatic operation of controller 100. Furthermore, in one embodiment, user interface 24 may present adjustment options to the occupant, such as a selection between the foremost position and rearmost position on the rail. In another embodiment, user interface 24 may provide the occupant with continuous adjustment options, for example, a sliding bar where the occupant is to specify any particular position on the rail. If an occupant attempts to adjust passenger seat 31, 40 through user interface 24, the automatic operation of controller 100 may automatically disable, and the occupant's input may override the automatic operation. In another embodiment, the adjustment of passenger seat 31, 40 may be disabled when the automatic operation of controller 100 is enabled, requiring the occupant to disable the automatic operation of controller 100 prior to receiving any user input to adjust passenger seat 31, 40 via user interface 24.

User interface 24 may additionally allow the occupants to input, update, and/or select a driver profile, and initiate preset configurations of vehicle 10. As discussed below, the driver profile may provide data to controller to automatically adjust a position of seats 30, 31, 40 based on physical characteristics and preferences of the driver.

Camera 26 may be any device configured to capture images or videos of the interior of vehicle 10 and to process the images or videos to visually determine the status of the occupants and operating conditions of vehicle 10. Camera 26 may be configured to determine physical characteristics of the driver, and generate a signal to controller 100 based on the determination. For example, camera 26 may be configured to capture and process an image to determine the torso height of the driver. Camera 26 may also be configured to detect the presence of passenger(s) in vehicle 10. Camera 26 may be used in conjunction with image recognition software stored in controller 100, such that the software may be configured to distinguish individuals from inanimate objects, and recognize certain individuals based on physical appearances stored in control 100. This data may be processed to determine the presence of occupants, as well as, automatically loading driver profiles, via controller 100.

Camera 26 may also be configured to capture and process images of driver sightlines. If the driver does not have sufficient visibility, camera 26 may generate a warning signal based on unsafe driving conditions. For example, camera 26 may be configured to capture and process images of rear window 16 and generate a warning signal if there are any objects obstructing a sightline of the driver out of rear window 16. This warning signal can be processed by controller 100 and outputted through user interface 24 or a separate warning indication device (not shown). In one embodiment, when the warning signal is present, controller 100 may preclude the driver from starting vehicle 10, until the visibility is improved. It is also contemplated that vehicle 10 may include a plurality of cameras 26 at different angles along necessary sightlines to determine that the driver has sufficient visibility for operating vehicle 10. It is further contemplated that camera 26 may embody wearable technology, such as Google Glass™ or other integrated imaging devices, such that camera 26 can readily determine the driver's sightlines, and generate a signal to controller 100 in response to any obstruction of the driver's vision. In this embodiment, camera 26 may be applied to glasses or releasably secured to clothes of the occupant, e.g., through pins or clips.

Status sensor 202 may be operatively connected to vehicle 10 and configured to generate a signal to determine when a sufficient condition occurs to enable the automatic seat adjustment system. The sufficient condition may be based on a number of different parameters of vehicle 10. For example, status sensor 202 may be operatively connected to a power source 200, embodying at least one of an electric motor, a combustion engine, and/or a battery. In one embodiment, status sensor 202 may be configured to generate a signal to controller 100 when vehicle 10 is turned on. In another embodiment, status sensor 202 may be operatively connected to a transmission and configured to generate a signal when the transmission is placed into gear (e.g., reverse or first gear). In yet another embodiment, status sensor 202 may be operatively connected to an accelerator and may be configured to generate a signal to controller 100 when the accelerator is actuated. In still another embodiment, status sensor 202 may be operatively connected to a driver side door of the vehicle, and may be configured to generate a signal to controller 100 when the driver side door opens and closes. It is contemplated that the control system 11 may allow the driver to determine what constitutes a sufficient condition, and to adjust the configuration based on stored settings. It is also contemplated that the sufficient condition may constitute an input (e.g., pressing a button) of the driver to enable the automatic seat adjustment system. In any sense, the sufficient condition sensed by status sensor 202 may determine a time point of an initial inquiry of the automatic seat adjustment system.

Each seat 30, 31, 40 may include a weight sensor 80 configured to generate a signal based on a weight placed on seat 30, 31, 40. As depicted in FIG. 2, weight sensor 80 may be incorporated within the interior of seat base 32. Weight sensor 80 may embody a strain gauge sensor configured to determine a change in resistance based on a weight applied on front passenger seat 31. Weight sensor 80 may be incorporated into a support of seat back 32 or may be a separate component. In one embodiment, weight sensor 80 may be configured to generate the signal based on a weight applied to front passenger seat 31 and direct the signal to controller 100 for processing.

Figure 3:
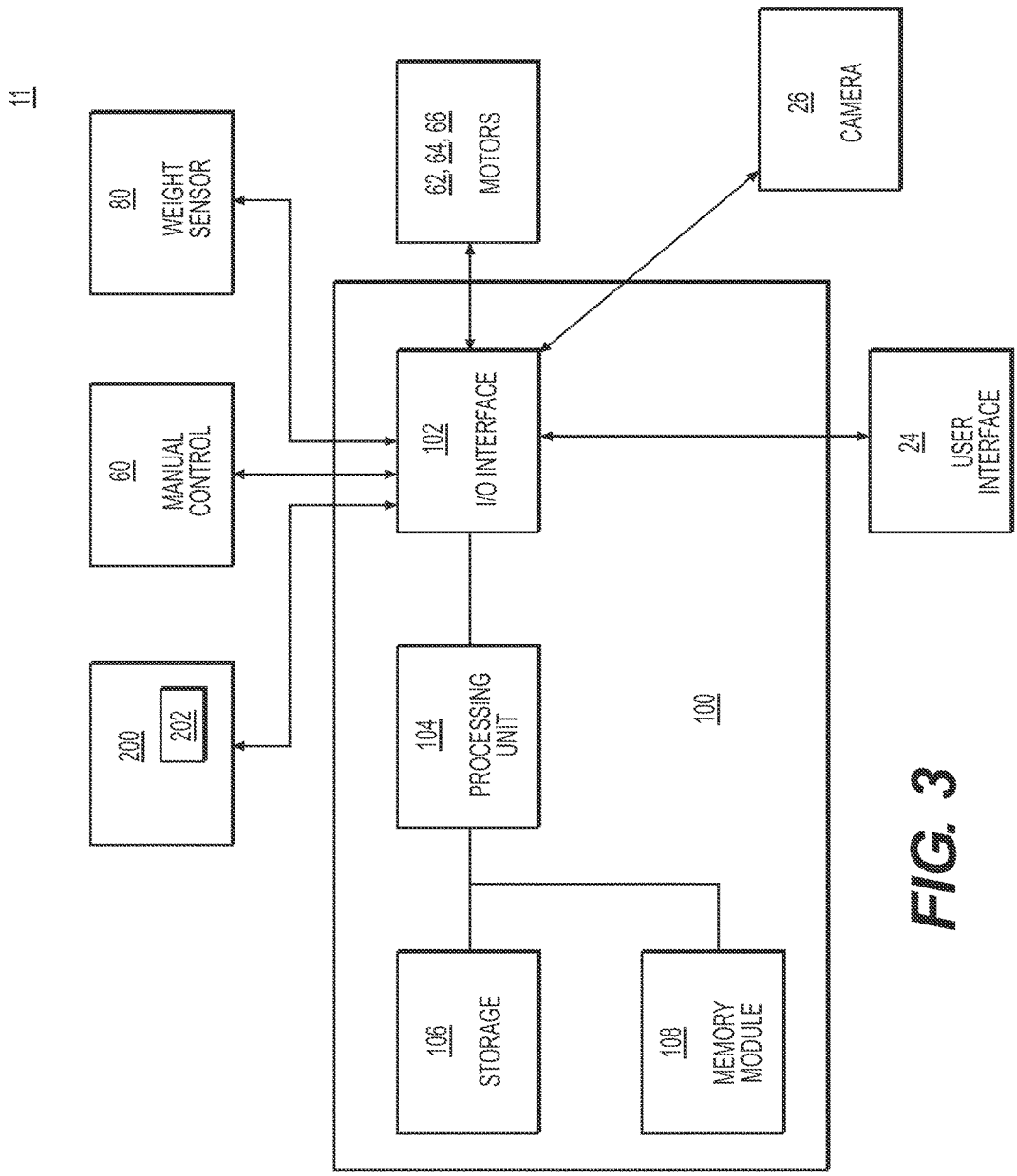
FIG. 3 is a block diagram of the exemplary control system of FIG. 2, according to an aspect of the disclosure.

FIG. 3 provides a block diagram of control system 11 associated with vehicle 10, in accordance with an exemplary embodiment of the present disclosure. As illustrated in FIG. 3, controller 100 may include, among other things, an I/O interface 102, a processing unit 104, a storage unit 106, and a memory module 108. These units may be configured to transfer data and send or receive instructions between or among each other.

I/O interface 102 may also be configured for two-way communication between controller 100 and various components of control system 11. For example, as depicted in FIG. 3, I/O Interface 102 may send and receive operating signals to and from user interface 24, camera 26, manual control 60, motors 62, 64, 66, and a plurality of sensors including, for example, status sensor 202 and weight sensor 80. I/O interface 102 may send and receive the data between each of the components via communication cables, wireless networks, or other communication mediums. I/O interface 102 may be configured to consolidate signals that it receives and relay the data to processing unit 104.

Processing unit 104 may include any appropriate type of general-purpose or special-purpose microprocessor, digital signal processor, or microcontroller. Processing unit 104 may be configured as a separate processor module dedicated to the automatic seat adjustment. Alternatively, processing unit 104 may be configured as a shared processor module for performing other functions unrelated to the automatic seat adjustment.

Processing unit 104 may be configured to receive signals from components of control system 11 and process the signals to determine a plurality of conditions of the operation of vehicle 10. Processing unit 104 may also be configured to generate and transmit command signals, via I/O interface, in order to actuate the components of control system 11.

Processing unit 104 may be configured to determine occupancy of passenger seat 31, 40. In one embodiment, processing unit 104 may be configured to receive a signal generated by weight sensors 80 of each passenger seat 31, 40, via I/O interface 102. Based on the signals, processing unit 104 may be configured to compare the sensed weight to a stored threshold weight to determine if one or more of passenger seats 31, 40 are occupied. For example, if the weight sensed is less than the threshold weight, controller 100 may be configured to determine that the seat is either unoccupied or is accommodating an object without sufficient weight to constitute an individual. However, if the weight sensed is greater than the threshold weight, processing unit 104 may determine that an individual is occupying seat. In another embodiment, processing unit 104 may be configured to determine occupancy of passenger seat 31, 40 by a signal received from camera 26. Specifically, camera 26 may be configured to capture an image of interior of vehicle 10, and transmit the image to controller 100 to be processed with image recognition software by processing unit 104 to determine occupancy. When detecting that no passenger is in passenger seat 31, 40, processing unit 104 may be configured to responsively generate a command signal directed to at least one of motors 62, 64, 66 to adjust passenger seat 31, 40 to a prospective position.

Processing unit 104 may also be configured to automatically initiate adjustment of seats 30, 31, 40 based on stored profiles associated with a specific driver. Data for the driver profiles may be entered via user interface 24 and stored in storage unit 106. For example, controller 100 may be configured to receive preset configurations of seats 30, 31, 40 for a specific driver, to associate the preset configuration with the specific driver, and to store the data in storage unit 106. Controller 100 may also be configured to receive other preferences and physical characteristics from the specific occupant, such as a height or a torso length, to associate the information with the specific driver, and to store the data in storage unit 106. Controller 100 may then be configured to recognize the specific driver, based on at least one of an input into user interface 24, an image captured by camera 26, a weight being placed on weight sensor 80, or any other indicator of the specific occupant. Once a driver is recognized, processing unit 104 may be configured to access the respective driver profile in storage unit 106, to generate a command signal based on the driver profile, and to transmit the command signals to motors 62, 64, 66 in order to automatically adjust seats 30, 31, 40.

In one embodiment, processing unit 104 may also be configured to determine, in real time, the positioning of driver seat 30. Processing unit 104 may be configured to access data in storage unit 106, detailing the current positioning of each of seat base 30, seat back 32, and headrest 34 of driver seat 30. Processing unit 104 may also be configured to update the data based on any command signal to motors 62, 64, 66 that repositions driver seat 30. In another embodiment, processor 104 may be configured to determine the position of driver seat 30 by sensors (not shown) positioned on each of seat base 30, seat back 32, and headrest 34 of driver seat 30. Processor 104 may also be configured to utilize the data to position passenger seats 31, 40 in a prospective position to optimize the sightlines of the driver. Processor 104 may also be configured to adjust passenger seat 31, 40 to other prospective positions based on any adjustment of driver seat 30. For example, if driver seat 30 is adjusted fore or aft relative to a B-pillar, front passenger seat 31 may obstruct the driver's sightline even though it is aligned laterally with the B-pillar. Therefore, front passenger seat 31 may be accordingly lowered relative to frame 12 to a lowest setting and adjusted either fore or aft in order to align passenger seat 31 with the B-pillar relative to driver seat 30. This may be determined by a look-up table, such as Table 1 provided below, where controller 100 references the longitudinal position of driver seat 31 to the look-up table to determine an optimal prospective position of front passenger seat 31. Controller 100 may implement this prospective position by generating a command signal to motors 62, 64, 66. For example, as represented in exemplary Table 1, controller 100 may be configured to initiate movement of front passenger seat 31 fore or aft according to the distance, $\Delta X$, as driver seat 30 is moved to a corresponding position, X. In this embodiment, the initiated movement of front passenger seat 31 may be in the same direction as movement of driver seat 30. However, in other embodiments, the initiated movement of front passenger seat 31 may be opposite of the movement of driver seat 30.

TABLE 1

| Longitudinal Position of Driver Seat (X, in mm) | Front Passenger Seat ($\Delta X$, from a rearmost position, in mm) |
|---|---|
| 2150 | −80 |
| 2155 | −78.5 |
| . . . | . . . |
| 2415 | 1.5 |
| 2420 | 0 |

Storage unit 106 and memory module 108 may include any appropriate type of mass storage provided to store any type of information that processing unit 104 may need to operate. For example, storage unit 106 may include one or more hard disk devices, optical disk devices, or other storage devices to provide storage space. Memory module 108 may include one or more memory devices including, but not limited to, a ROM, a flash memory, a dynamic RAM, and a static RAM.

Storage unit 106 and/or memory module 108 may be configured to store one or more computer programs that may be executed by controller 100 to perform seat adjustment functions. Storage unit 106 and/or memory module 108 may be further configured to store information used by processing unit 104. For example, storage unit 106 may be configured to store data pertaining to prospective positions used by processor 104. Storage unit 106 may be configured to store design parameters of vehicle 10. Storage unit 106 may be configured to store thresholds used by processor 104, such as weight thresholds used to determine occupancy of each passenger seats 30, 31, 40. Storage unit 106 may also be configured to store driver profiles, such as desired positions of seats 30, 31, 40 and length of a driver's torso. Storage unit 106 and/or memory module 108 may be further configured to store algorithms and/or look-up tables, such as algorithms or look-up tables to determine adjustment of passenger seats 31, 40 responsive to adjustment of driver seat 30.

Figure 4:
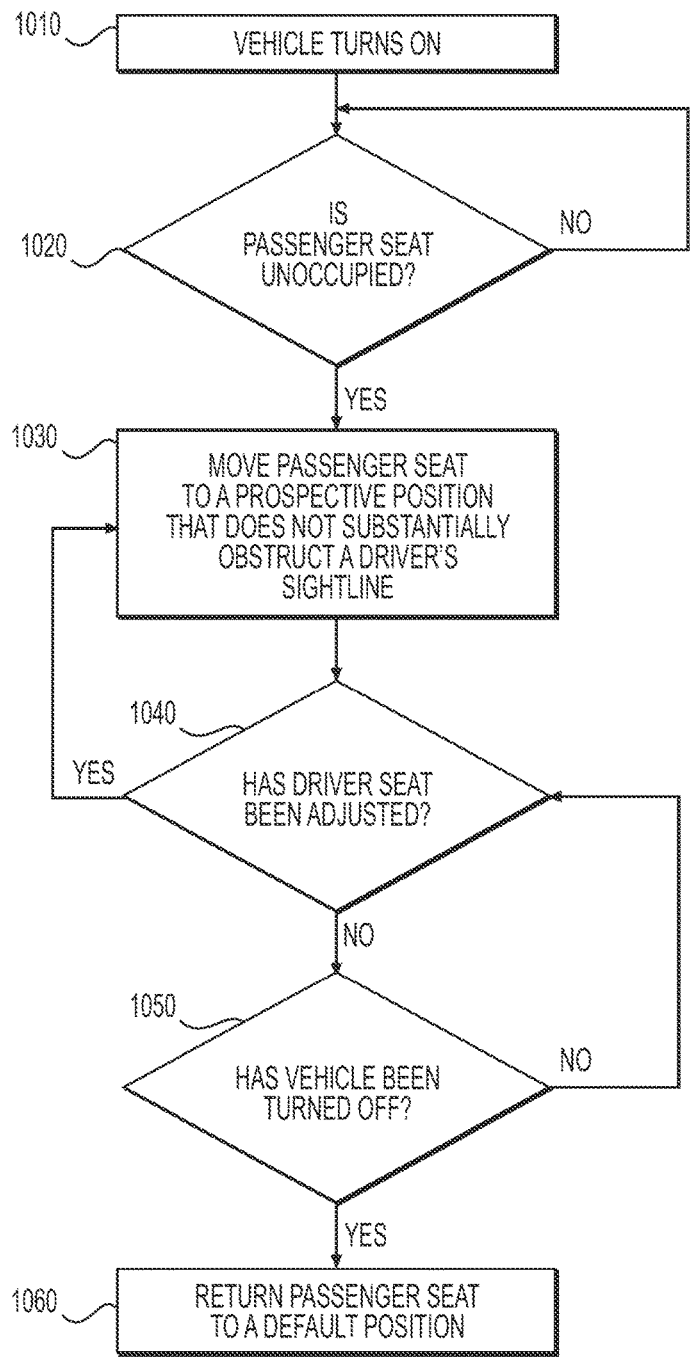
FIG. 4 is a flowchart illustrating an exemplary process that may be performed by the control system of FIG. 2 and/or FIG. 3, according to an aspect of the disclosure.

FIG. 4 illustrates an exemplary automatic seat adjustment method 1000 performed by control system 11. The disclosed control system 11 may be used on any vehicle where passenger seats may obstruct a driver's sightline. By automatically adjusting the passenger seats to a prospective position, control system 11 may reduce blind spots allowing the driver better visibility of other vehicles and objects. Additionally, by automatically placing the passenger seats in certain prospective positions when unoccupied, control system 11 may increase the available cubic feet for containing cargo. Operation of control system 11 will now be described with respect to FIG. 4.

In Step 1010, control system 11 may determine whether a condition occurs, indicating that a trip has started, to enable control system 11 to perform method 1000. As shown in FIG. 4, the condition may be determined by a signal generated by status sensor 202 when vehicle 10 turns on. However, other conditions are contemplated. In one embodiment, the condition may occur when status sensor 202 determines that vehicle 10 turns over. In another embodiment, the condition may occur when status sensor 202 determines that the transmission is placed into a gear (e.g., reverse or first gear). In yet another embodiment, the condition may occur when status sensor 202 determines that a throttle is actuated. The control system 11 may allow the driver to determine what constitutes a condition discussed above, and to adjust the configuration based on stored settings. The condition may constitute an input (e.g., pressing a button) of the driver to enable the automatic seat adjustment. The sufficient condition may signal to controller 100 to initiate an initial inquiry of the automatic seat adjustment.

In step 1020, one or more components of control system 11 may determine whether a passenger seat is unoccupied. As depicted in FIG. 4, weight sensor 80 may generate a signal based on a weight placed on passenger seat 31, 40, and direct the signal to controller 100. In one embodiment, the determination may be based on any weight applied to passenger seat 31, 40. In another embodiment, the determination may be based on whether a weight applied to passenger seat 31, 40 exceeds a threshold. In this embodiment, controller 100 may adjust passenger seat 31, 40 when a light weight is placed on passenger seats 31, 40, but not when an object that has a weight of an individual is applied to passenger seats 31, 40. It is also contemplated that other components of control system may enable the determination of step 1020. For example, camera 26, in conjunction with image recognition software installed in controller 100, may determine whether passenger seat 31, 40 is unoccupied. If control system 11 determines that at least one passenger seat 31, 40 is unoccupied (step 1020: Yes), method 1000 may proceed to step 1030 for adjusting each passenger seat 31, 40 determined to be unoccupied. Otherwise (step 1020: No), control system 11 may disable itself with respect to the at least one passenger seat 31, 40 determined to be occupied. In another embodiment, control system 11 may continuously monitor the at least one passenger seat 31, 40 determined to be occupied and may proceed to step 1030 if passenger seat 31, 40 is later determined to be unoccupied.

In step 1030, control system 11 may adjust unoccupied passenger seats 31, 40 to a prospective position that does not substantially obstruct a driver's sightline. Specifically, step 1030 may be performed by motors 62, 64, 66, in response to a command signal from controller 100. The prospective position of step 1030 may constitute a number of different positions of passenger seat 31, 40. As depicted in FIG. 1, prospective position 31' may constitute aligning front passenger seat 31 with pillar 20 of frame 12, and prospective position 40' may constitute folding seat back 44 of rear passenger seat 40 over seat base 42. In another embodiment, the prospective position of passenger seat 31, 40 may be determined based on the position of driver seat 30. For example, controller 100 may be configured to determine the prospective position of passenger seat 31, 40 based on algorithms or look-up tables stored in storage unit 106. The algorithms or look-up tables may factor in the position of driver seat 30 and a length of the torso of the driver. The algorithms or look-up tables may also factor in design parameters of vehicle 10.

In step 1040, control system 11 may determine whether driver seat 30 has been adjusted. For example, the driver may move its seat position during a trip. A change of position in driver seat 30 may alter the driver's sightline and thus, require a change of position in passenger seat 31, 40. If driver seat 30 has been adjusted (step 1040: Yes), control system 11 may perform step 1030 again to correspondingly adjust the prospective position of passenger seats 31, 40. Controller 100 may determine an adjustment of driver seat 30 via data pertaining to the position of driver seat 30 stored in storage unit 106 and command signals directed to motors 62, 64, 66 of driver seat 30. Controller 100 may continually update data of storage unit 106 based on the real time adjustment of driver seat 30. Based on the stored algorithms or look-up tables, controller 100 may use the updated data to determine optimal prospective positions of passenger seats 31, 40 based on the position of driver seat 30. Controller 100 may then generate a command signal to motors 62, 64, 66 of passenger seat 31, 40 for adjustment in step 1030.

If driver seat 30 is not adjusted (step 1040: No), method 1000 may proceed to step 1050. In step 1050, control system 11 may determine whether a specific condition occurs, indicating that a trip has finished, to disable the automatic seat adjustment. As depicted in FIG. 4, the condition may occur when vehicle 10 is turned off. In another embodiment, the condition may occur when driver seat 30 becomes unoccupied, e.g., when weight sensor 80 determines that the driver has left driver seat 30. In yet another embodiment, the condition may occur when doors of vehicle 10 have either opened or closed. If a condition does not occur (step 1050: No), method 1000 may go back to step 1040 and continue to monitor whether driver seat 30 is adjusted.

If a specific condition is determined to have occurred (step 1050: Yes), method 1000 may proceed to step 1060, where control system 11 may return passenger seats 31, 40 to a default position. The default position may constitute any predetermined positions of passenger seats 31, 40. In one embodiment, the default position may be a neutral position accommodating an occupant into passenger seats 31, 40. In another embodiment, the default position may be the position of passenger seat 31, 40 prior to the automatic seat adjustment. In some embodiments, step 1060 may be omitted, such that control system 11 maintains the prospective position of passenger seat 31, 40 after vehicle 10 after the trip has ended.

Another aspect of the disclosure is directed to a non-transitory computer-readable medium storing instructions which, when executed, cause one or more processors to perform the automatic seat adjustment method, as discussed above. The computer-readable medium can include volatile or non-volatile, magnetic, semiconductor, tape, optical, removable, non-removable, or other types of computer-readable medium or computer-readable storage device. For example, the computer-readable medium may be storage 106 or memory module 108 having the computer instructions stored thereon, as disclosed in connection with FIG. 3. In one embodiment, the computer-readable medium may be a disc or a flash drive having the computer instructions stored thereon.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system for enhancing visibility of a driver of a vehicle, the control system comprising:
   a first sensor configured to generate a first signal indicative of a weight placed on a passenger seat;
   a second sensor configured to generate a second signal indicative of a position of a driver seat;
   at least one motor configured to adjust a position of the passenger seat; and
   a controller in communication with the first sensor, second sensor, and the at least one motor, the controller being configured to:
      receive the first signal from the first sensor;
      receive the second signal from the second sensor;
      determine that the passenger seat is unoccupied based on the first signal;
      determine the position of the driver seat based on the second signal; and
      automatically generate a command signal directed to the at least one motor to adjust the passenger seat to a prospective position different from the position of the driver seat, wherein the command signal is based at least on the first and second signal.

2. The control system of claim 1, wherein the at least one motor is configured to move the passenger seat substantially fore or aft relative to the vehicle.

3. The control system of claim 2, wherein the at least one motor is configured to tilt a back of the passenger seat and adjust a head rest of the passenger seat.

4. The control system of claim 1, wherein the prospective position of the passenger seat is substantially aligned with a structural element of the vehicle.

5. The control system of claim 4, wherein the structural element is a pillar of a frame of the vehicle.

6. The control system of claim 1, wherein the prospective position of the passenger seat is in a rear most position.

7. The control system of claim 1, wherein the first sensor is positioned within the passenger seat and is configured to generate the first signal based on the weight placed on the passenger seat.

8. The control system of claim 1, further including a manual control configured to receive a user input from the driver overwriting the command signal that adjusts the prospective position of the passenger seat.

9. The control system of claim 1, further including a user interface configured to receive a user input from the driver that enables or disables the controller.

10. A method of enhancing the visibility of a driver of a vehicle, the method comprising:
    sensing a weight placed on a passenger seat and responsively generating a first signal;
    sensing a position of a driver seat and responsively generating a second signal;
    receiving the first and second signals;
    determining that the passenger seat is unoccupied based on the first signal;
    generating a command signal directed to at least one motor based at least on the first and second signal;
    adjusting the passenger seat to a prospective position different from the position of the driver seat.

11. The method of claim 10, wherein the adjusting includes moving the passenger seat fore or aft relative to the vehicle.

12. The method of claim 11, wherein the adjusting includes tilting a back of the passenger seat.

13. The method of claim 11, wherein the adjusting includes adjusting the position of the headrest relative to a back.

14. The method of claim 10, wherein the adjusting positions the passenger seat substantially aligned with a pillar of a frame of the vehicle.

15. The method of claim 10, wherein the adjusting further comprises positioning the passenger seat in a rear most position with respect to the vehicle.

16. A vehicle comprising:
    a driver seat configured to accommodate a driver;
    a passenger seat configured to accommodate a passenger; and
    a control system including:
       a first sensor configured to generate a first signal indicative of a weight placed on the passenger seat;
       a second sensor configured to generate a second signal indicative of a position of the driver seat;
       at least one motor configured to adjust a position of the passenger seat; and
       a controller in communication with the first sensor, second sensor, and the at least one motor, the controller being configured to:
          receive the first signal from the first sensor;
          receive the second signal from the second sensor;
          determine that the passenger seat is unoccupied based on the first signal; and
          automatically generate a command signal directed to the at least one motor to adjust the passenger seat to a prospective position different from the position of the driver seat.

17. The control system of claim 1, further comprising a third sensor configured to generate a third signal indicative of a driver characteristic, wherein the controller is further configured to receive the third signal, and wherein the command signal to adjust the passenger seat to a prospective position is further based on the third signal.

18. The method of claim 10, further comprising sensing a driver characteristic and responsively generating a third signal, and wherein the command signal directed to the at least one motor is further based on the third signal.

19. The control system of claim 1, wherein the controller is further configured to detect a change in the position of the driver seat in a first direction and responsively generate the command signal such that the at least one motor adjusts the passenger seat to the prospective position by moving the passenger seat in a second direction different than the first direction.

* * * * *